United States Patent [19]
Yamashita et al.

[11] Patent Number: 5,359,477
[45] Date of Patent: Oct. 25, 1994

[54] RECORDING AND/OR REPRODUCING APPARATUS HAVING A CASSETTE LOADING APPARATUS

[75] Inventors: Keitaro Yamashita; Hiroshi Fujii, both of Tokyo, Japan

[73] Assignee: Sony Corporation, Tokyo, Japan

[21] Appl. No.: 52,236

[22] Filed: Apr. 22, 1993

Related U.S. Application Data

[63] Continuation of Ser. No. 682,267, Apr. 8, 1991, abandoned.

[30] Foreign Application Priority Data

Apr. 13, 1990 [JP] Japan .................... 2-098560

[51] Int. Cl.$^5$ ............................... G11B 5/008
[52] U.S. Cl. .......................... 360/94; 360/85
[58] Field of Search ............... 360/94, 137, 90, 85

[56] References Cited

U.S. PATENT DOCUMENTS

| | | | |
|---|---|---|---|
| 4,864,449 | 9/1989 | Inoue et al. ............................. | 360/94 |
| 4,972,278 | 11/1990 | Hara et al. ............................. | 360/94 |
| 5,012,364 | 4/1991 | Hirayama et al. .................... | 360/94 |
| 5,032,939 | 7/1991 | Mihara et al. ......................... | 360/94 |
| 5,105,319 | 4/1992 | Ohoka et al. ......................... | 360/94 |
| 5,237,470 | 8/1993 | Sasaki .................................... | 360/94 |

FOREIGN PATENT DOCUMENTS

| | | | |
|---|---|---|---|
| 2843336 | 4/1979 | Fed. Rep. of Germany ........ | 360/94 |
| 57-88578 | 6/1982 | Japan .................................... | 360/94 |
| 60-205885 | 10/1985 | Japan .................................... | 360/94 |
| 63-112845 | 5/1988 | Japan .................................... | 360/94 |

OTHER PUBLICATIONS

Patent Abstracts of Japan, vol. 12, No. 473 (P-799) Dec. 12, 1988, corresponds to Japanese Appln. 62-023051.
Patent Abstracts of Japan, vol. 10, No. 212 (P-480) Jul. 24, 1986, corresponds to Japanese Appln. 59-172886.

*Primary Examiner*—A. J. Heinz
*Attorney, Agent, or Firm*—William S. Frommer; Alvin Sinderbrand

[57] ABSTRACT

A recording/reproducing apparatus is capable of operating with either one of two different types of tape cassettes which each have a cassette housing with a bottom wall having an underside formed with locating holes in a respective pattern, different from the pattern of the locating holes of the other type of tape cassettes. The recording/reproducing apparatus is provided with locating pin devices at least some of which have a retractable locating pin capable of retracting below a predetermined plane of the underside of the bottom wall of the positioned tape cassette when such tape cassette lacks a locating hole at the location of the respective locating pin device.

13 Claims, 14 Drawing Sheets

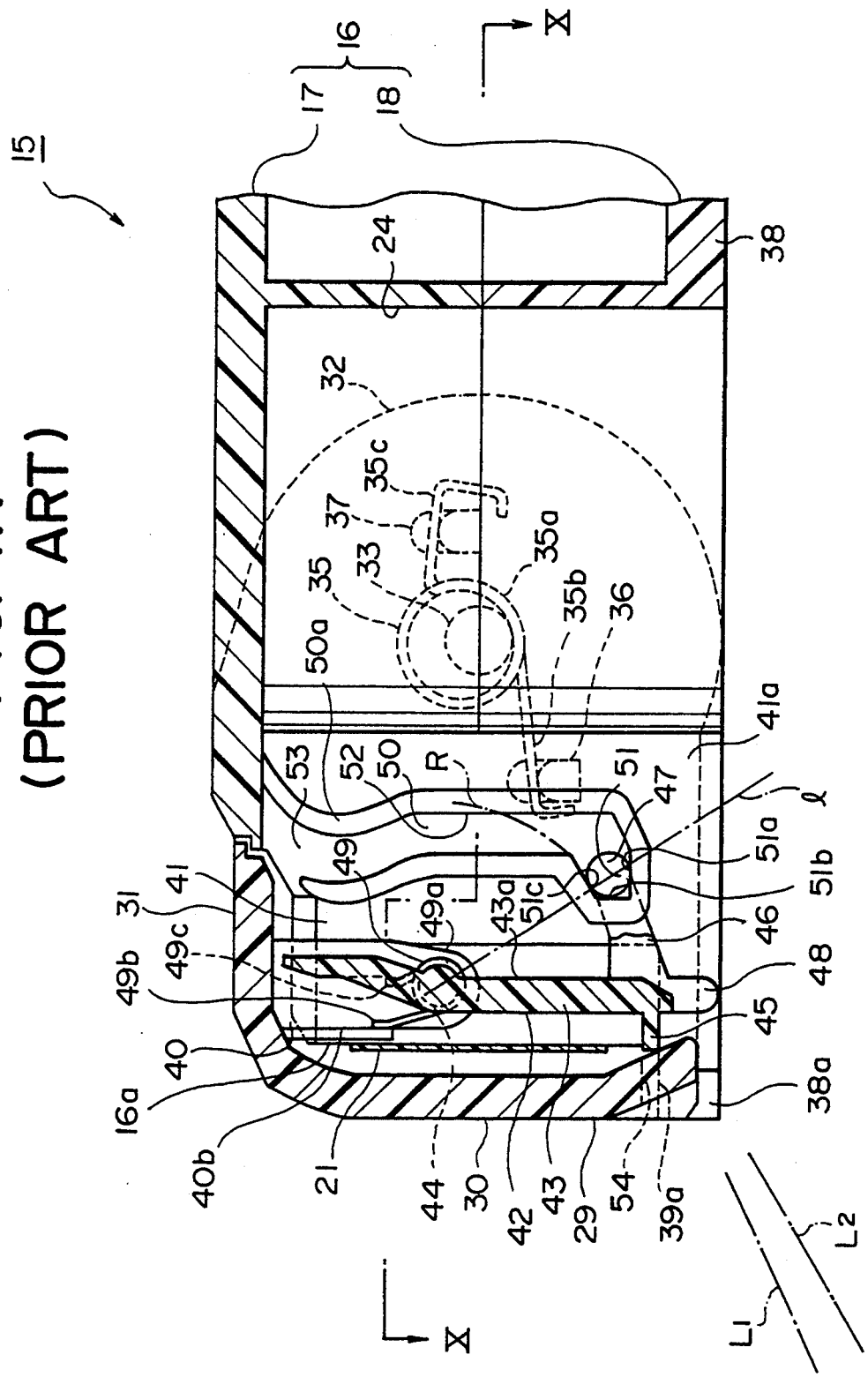

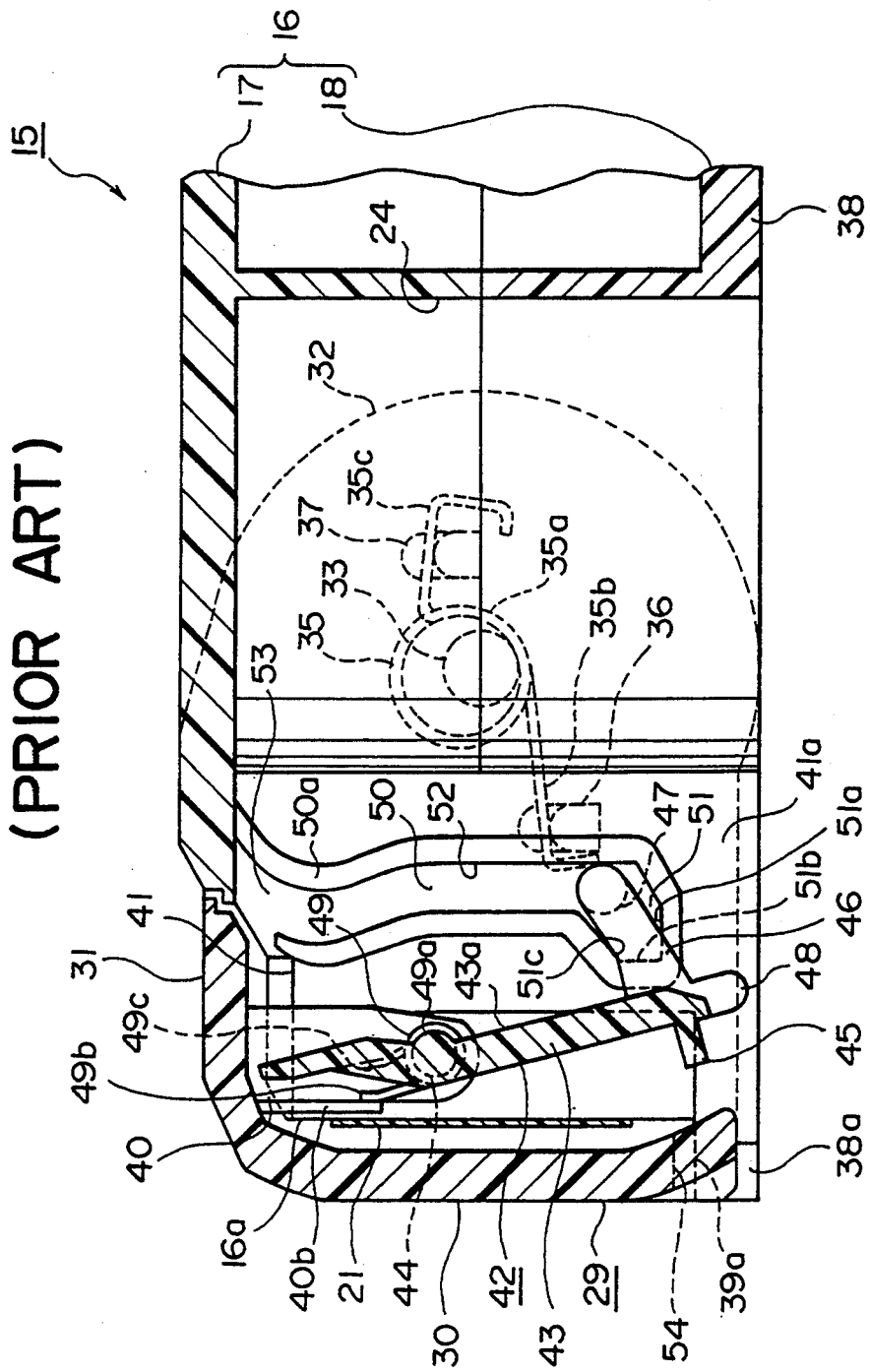

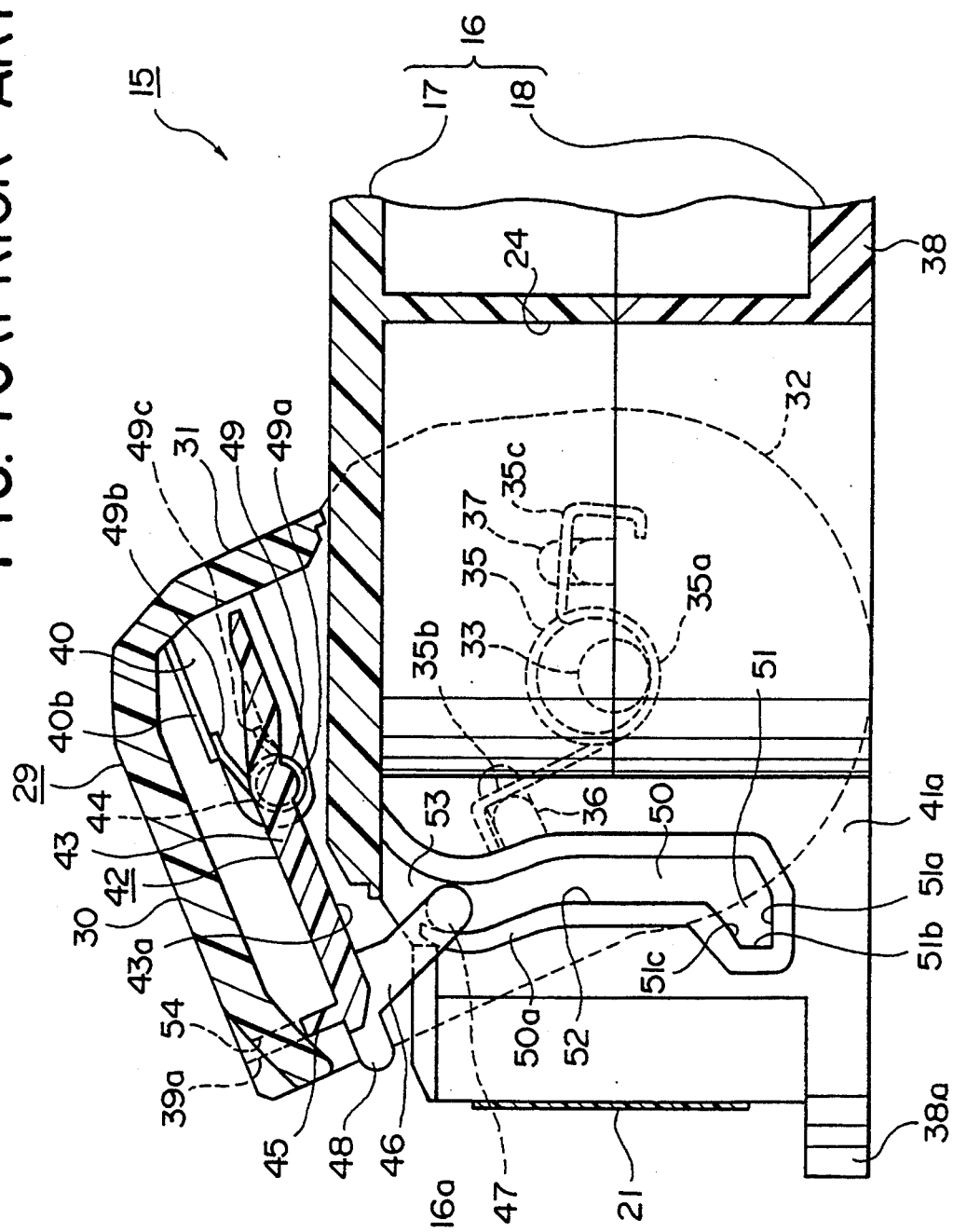

RECORDING AND/OR REPRODUCING APPARATUS HAVING A CASSETTE LOADING APPARATUS

This application is a continuation of application Ser. No. 07/682,267, filed Apr. 8, 1991, now abandoned.

BACKGROUND OF THE INVENTION

1. Field of the Invention

The present invention relates to an improved recording/reproducing apparatus and, more specifically, to a recording/reproducing apparatus capable of operating with either one of two different types of tape cassettes, each of which includes a cassette housing with a bottom wall having an underside formed with locating holes in a respective pattern which pattern is different from that of the locating holes of the other type of tape cassette.

2. Description of the Prior Art

A recording/reproducing apparatus, more specifically, a video tape recorder (hereinafter abbreviated as "VTR"), capable of operating with either one of two different tape cassettes, a VHS tape cassette and a VHS-C tape cassette, has been proposed. The known VTR were primarily designed to operate with a VHS tape cassette, and could not (by themselves) accommodate the VHS-C tape cassettes, which deviated from the standard VHS tape cassettes in several ways, in particular in respect to the pattern of locating holes in the underside of the tape cassette's bottom wall. Before loading a VHS-C tape cassette in the VTR, the VHS-C tape cassette would be mounted on a cassette adapter having a shape virtually the same as that of a VHS tape cassette, and formed with locating holes in a pattern corresponding to the pattern of the locating holes in a VHS tape cassette.

SUMMARY OF THE INVENTION

Accordingly, it is an object of the present invention to provide a recording/reproducing apparatus capable of being loaded with either one of the two different types of tape cassettes without the need to employ a cassette adapter.

According to the present invention, a recording/reproducing apparatus capable of being loaded with either one of two different types of tape cassettes such as, a standard tape cassette and a nonstandard tape cassette, is provided with a plurality of locating pin devices at locations corresponding to the patterns of said locating holes in both of the two types of tape cassettes, with at least some of said locating pin devices including respective retractable locating pins capable of retracting below a plane corresponding to the lower surface of the bottom wall of a tape cassette.

When the recording/reproducing apparatus is loaded with either tape cassette, the unused retractable locating pins retract, this preventing obstruction of the loaded tape cassette.

BRIEF DESCRIPTION OF THE DRAWINGS

The above and other objects, features and advantages of the present invention will become more apparent from the following description taken in connection with the accompanying drawings, in which:

FIGS. 7A to 7C are enlarged cross-sectional views of an essential portion of the advanced tape cassette of FIG. 6 respectively showing different stages of an operation for opening front and back lids incorporated into the advanced tape cassette;

DESCRIPTION OF THE PREFERRED EMBODIMENTS

TAPE CASSETTES

The two different types of tape cassettes, with locating holes in two different patterns, will be described prior to the description of the recording/reproducing apparatus. One of the two tape cassettes is a conventional VHS tape cassette, and the other is an advanced tape cassette having an external shape similar to that of the conventional VHS tape cassette.

Figure 5:
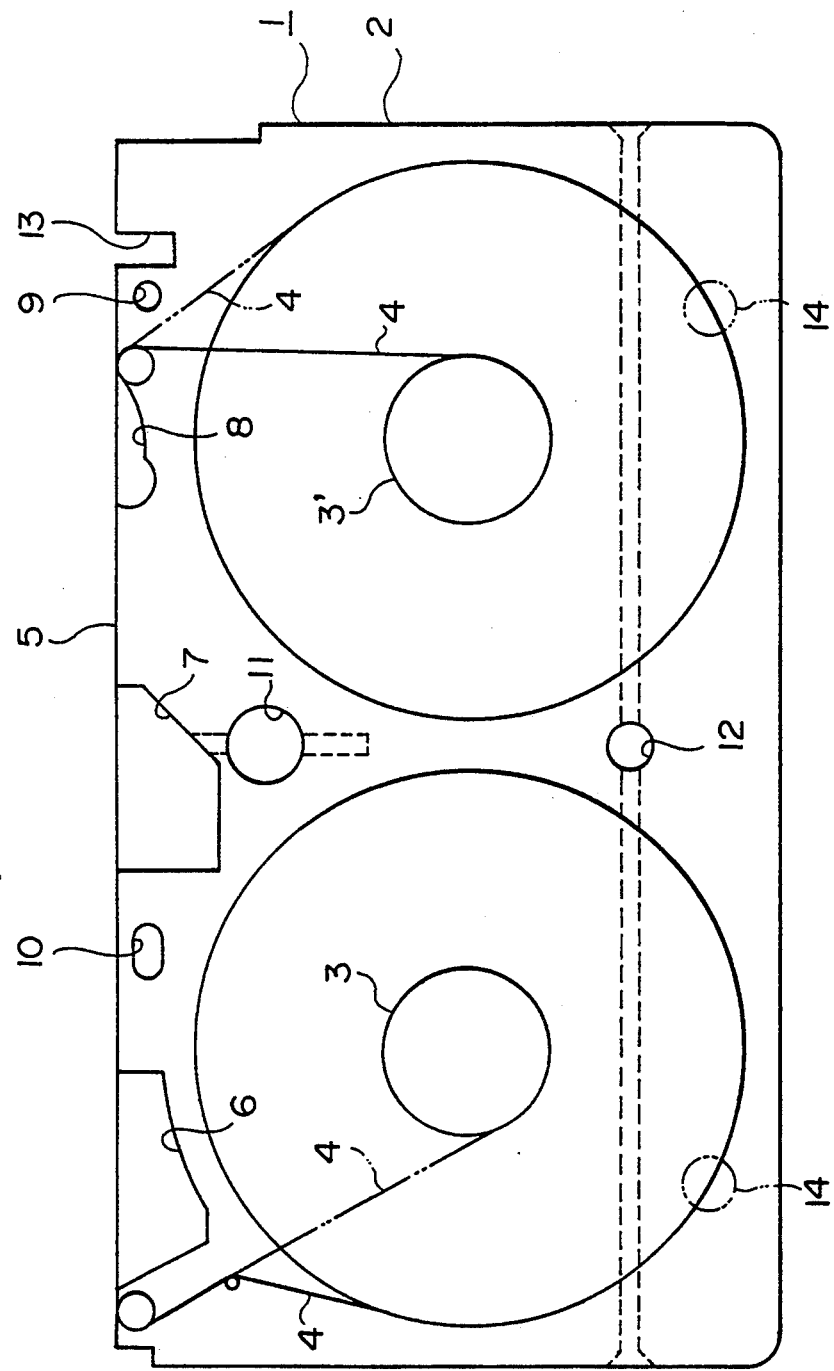
FIG. 5 is a plan view showing the general construction of a VHS tape cassette.
Figure 6:
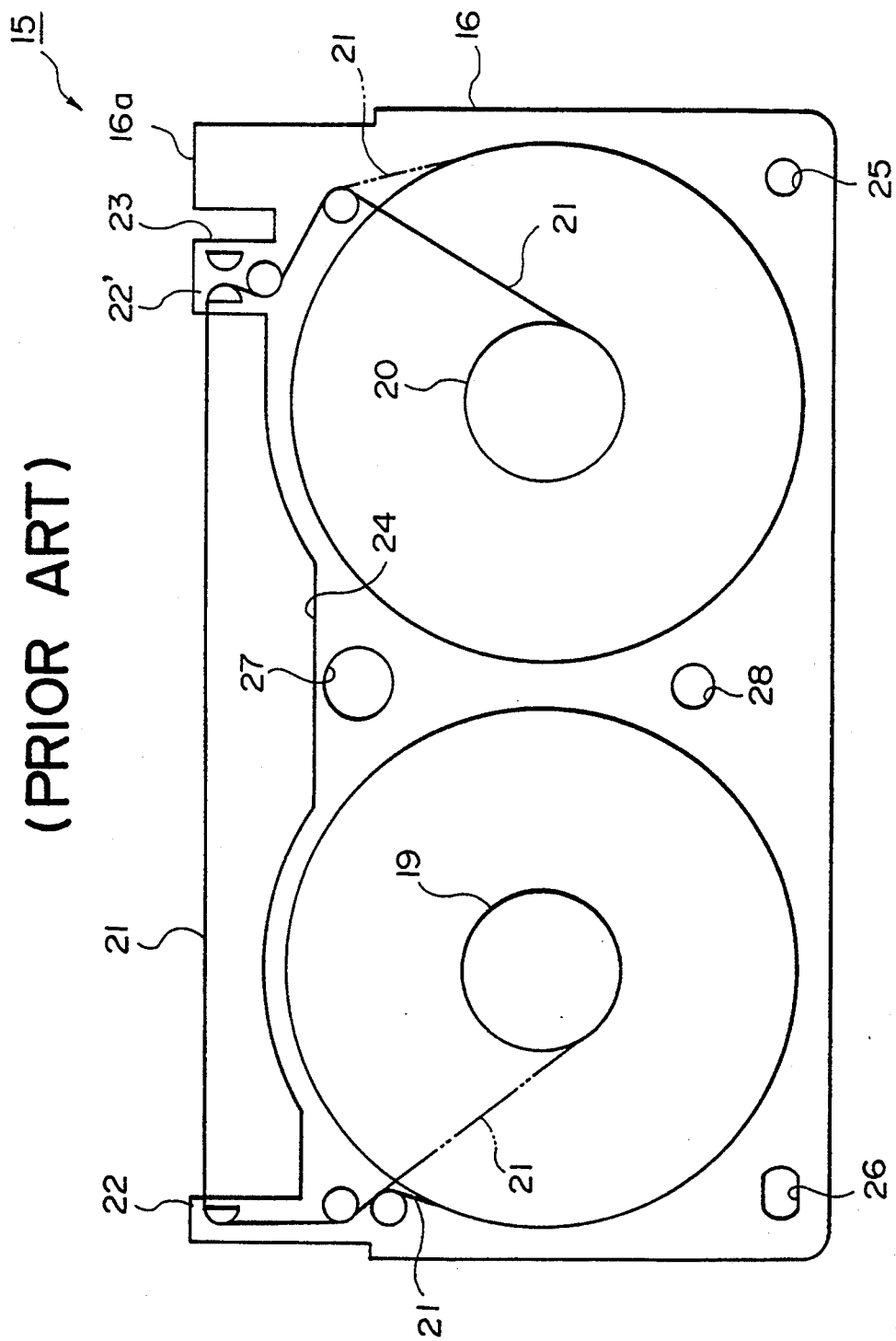
FIG. 6 is a plan view of an advanced tape cassette, similar to FIG. 5.
Figure 13:
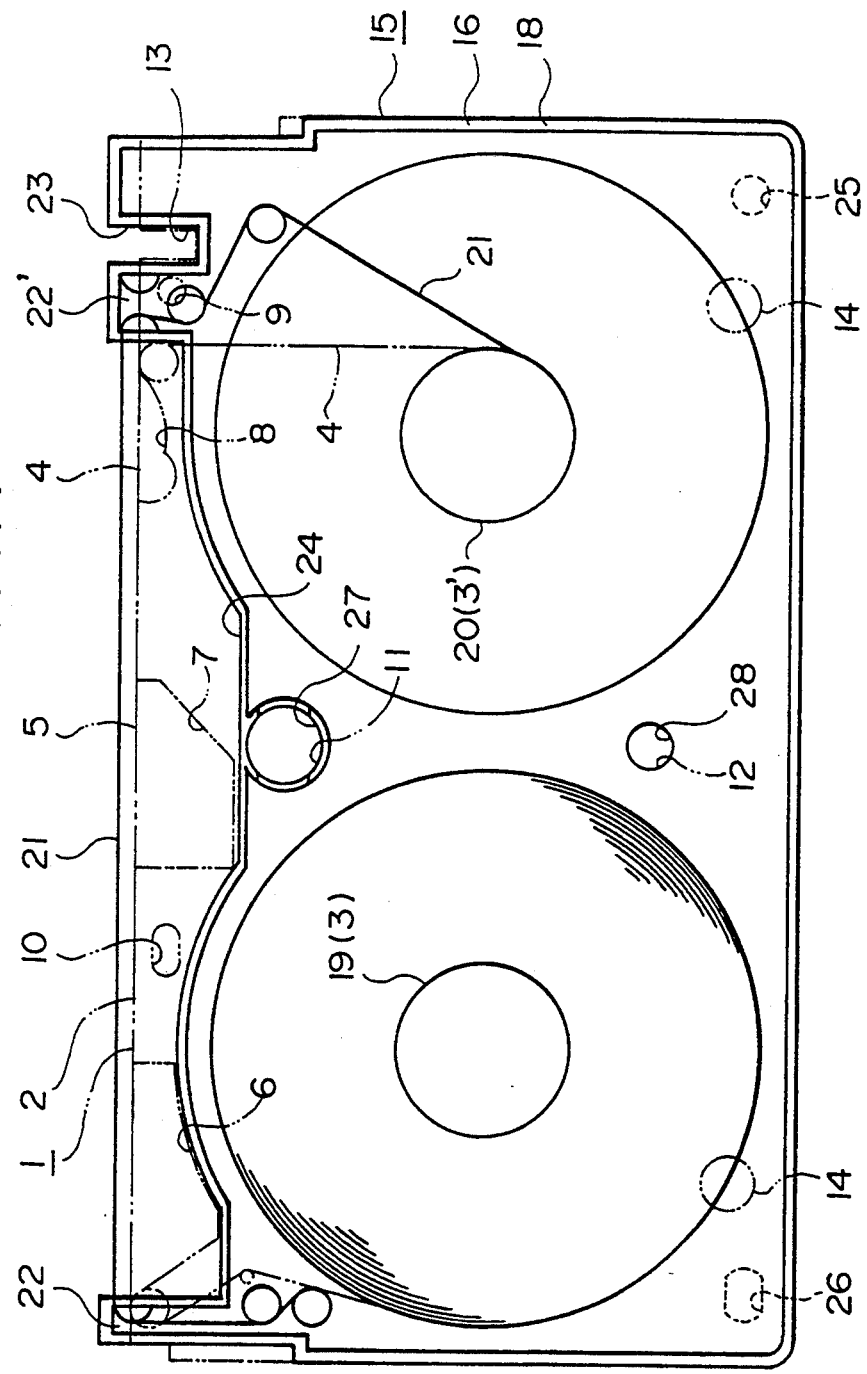
FIG. 13 is a schematic plan view showing two different types of tape cassettes placed one over the other.

(1) Conventional VHS Tape Cassette (FIGS. 5 and 13)

A conventional VHS tape cassette 1 shown in FIG. 5 comprises a case 2, two tape reels 3 and 3' journaled on the case 2 for rotation, and a front lid, not shown. A magnetic tape 4 wound round the tape reels 3 and 3' has opposite ends fastened respectively to the tape reels 3 and 3'. While the VHS tape cassette 1 is not in use, the magnetic tape 4 extends along the front wall 5 of the case 2. In operating the VHS tape cassette for recording or reproducing, the magnetic tape 4 is pulled out from the case 2 through openings formed in the case 2 near the opposite ends of the front wall 5. The case 2 is provided in its front portion with open recesses 6, 7 and 8 opening in the front wall 5 and lower wall thereof. The recesses 6 and 7 receive, respectively, the loading tape guide and the swing guide for pulling out the tape 4 from the case 2 and guiding the same along a predetermined tape path when the tape cassette 1 is inserted in the recording/reproducing apparatus, and the recess 8 receives the capstan when the tape cassette 1 is inserted in the recording/reproducing apparatus. A circular locating hole 9 is formed in the lower wall of the case 2 on the right-hand side of the recess 8 for the capstan at a small distance from the recess 8. A locating hole 10 having the shape of a slot laterally extending along the tape path is formed in the lower wall of the case 2 substantially at the middle between the recesses 6 and 7 for the loading tape guide and the swing guide. The case 2 is provided further with a hole 11 for receiving the light emitting head of the tape end sensor which detects end marks marked on the magnetic tape 4 to indicate the ends of the same; unlocking hole 12 for receiving a reel unlocking pin, which unlocks the tape reels 3 and 3', and a groove 13 for receiving the lid opening member which turns the front lid (not shown), to its open position.

When the tape cassette 1 is inserted in the recording-/reproducing apparatus, locating pins engage the locating holes 9 and 10, respectively, and portions 14 of the bottom wall of the case 2 are seated on the upper ends of the support pins of the recording/reproducing apparatus to locate the tape cassette 1 correctly on the recording/reproducing apparatus.

(2) Advanced Tape Cassette (FIGS. 6 to 13)

An advanced tape cassette 15 has an external shape similar to that of the VHS tape cassette 1 and is slightly different in construction from the VHS tape cassette 1. The length of the tape cassette 15 is the same as the length of the VHS tape cassette 1, and its width is slightly greater than that of the VHS tape cassette 1. The tape cassette 15 is provided with a front lid covering the front side of the magnetic tape, and a back lid for covering the backside of the magnetic tape. The front and back lids cover an exposed portion of the magnetic tape when the tape cassette 15 is not in use to avoid polluting the exposed portion of the magnetic tape with dust, which is essential particularly in the case of a magnetic tape for high-density recording.

A flat rectangular case 16 is assembled by fastening together an upper half case 17 and a lower half case 18, which are formed of a synthetic resin in the shape of a shallow, rectangular pan. A pair of tape reels 19 and 20 are supported for rotation within the case 16, and a magnetic tape 21 is wound on the tape reels 19 and 20. Gates 22 and 22' are formed respectively at the opposite ends of the front side 16a of the case 16. The magnetic tape 21 unwound from the reel 19 extends outside the case 16 through the gate 22, travels through a region between the gates 22 and 22' (hereinafter referred to as a "pull-out region"), enters the case 16 through the other gate 22', and is wound on the tape reel 20. A groove or notch 23 for receiving the lid opening member is formed beside the gate 22' across the front, upper and lower walls of the case 16. A recess 24 is formed in the front portion of the case 16 to define the pull-out region. The depth of the recess 24 in a plane including the upper wall of the case 16 is smaller than the depth of the same in a plane including the lower wall of the case 16. The front edge of the upper wall defining the bottom of the recess 24 is straight. When the tape cassette 15 is placed on the VHS tape cassette 1 as shown in FIG. 13, the recesses 6, 7 and 8 of the VHS tape cassette 1 are included in the area occupied by the recess 24 of the tape cassette 15.

Locating holes 25 and 26 are formed in the lower wall of the case 16 at the opposite ends respectively of the back portion of the lower wall. The locating hole 25 is a circular hole, and the locating hole 26 is a slot. A hole 27 for receiving the light emitting head of the tape end sensor is formed in the lower wall of the case 16 near the middle portion of the bottom surface of the recess 24. A hole 28 for receiving the reel unlocking pin is formed in the middle of the back portion of the lower wall of the case 16.

Figure 8:
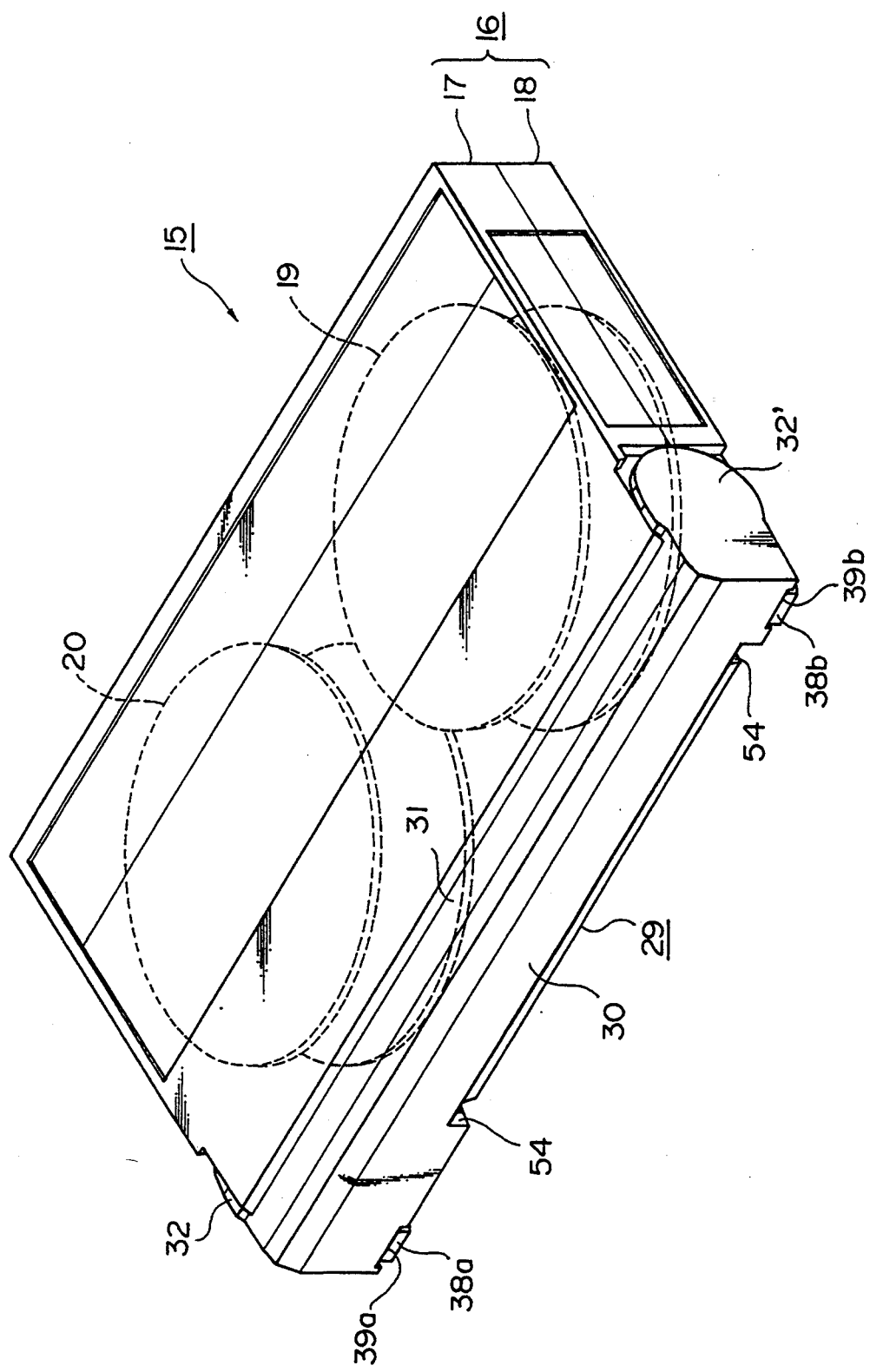
FIG. 8 is a perspective view of the advanced tape cassette shown in FIGS. 7A to 7C, in which the front and back lids are closed.
Figure 9:
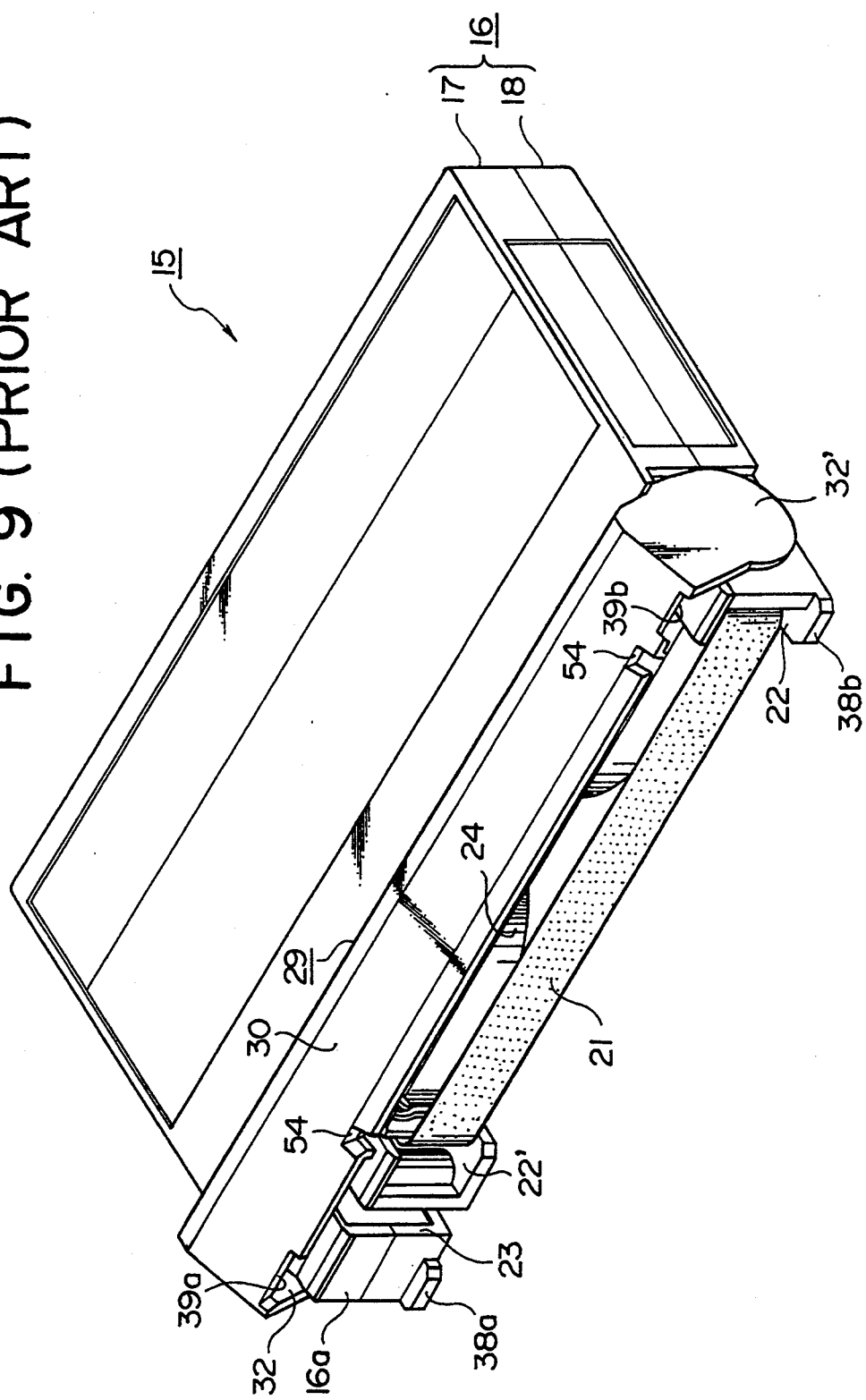
FIG. 9 is a perspective view similar to FIG. 8, in which the front and back lids are open.

The front surface 16a of the case 16 is covered entirely with a front lid 29 (FIGS. 8 and 9) formed of a synthetic resin. The front lid 29 has a front wall 30, an upper wall 31 extending backward from the upper edge of the front wall 30, and side walls 32 and 32' extending backward respectively from the side edges of the front wall 30. Pivots 33 (FIG. 22) and 33' project inward respectively from the middles of the rear portions of the inner surfaces of the side walls 32 and 32' of the front lid 29. The pivots 33 and 33' are fitted for turning respectively in holes 34 and 34' formed respectively in the side walls of the case 16 near the front ends of the same. Thus, the front lid 29 is supported pivotally on the case 16 by the pivots 33 and 33' so as to turn between a closed position where the front wall 30 thereof covers the front surface 16a of the case 16 as shown in FIG. 8, and an open position where the front wall 30 of the front lid 29 is moved away from the front surface 16a of the case 16 as shown in FIG. 9. The front lid 29 is urged to the closed position by a torsion spring 35 having a coil section 35a, and two arms 35b and 35c projecting respectively from the opposite ends of the coil section 35a. The coil section 35a is mounted on a portion of the pivot 33 between the side wall 32 of the front lid 29 and the side wall of the case 16, the arm 35b is elastically engaged with the upper surface of a projection 36 projecting from the inner surface of the side wall 32 of the front lid 29 at a position on the front side of the pivot 33, and the other arm 35c is elastically engaged with the upper surface of a projection 37 projecting from the outer surface of the side wall of the case 16 to urge the front lid 29 to the closed position. The opposite ends 38a and 38b of the front edge of the bottom wall 38 of the case 16 project to the front beyond the front surface 16a. Shallow recesses 39a and 39b (FIGS. 8 and 9) are formed in the lower edge of the front wall 30 of the front lid 29 near the opposite ends of the lower edge so as to mate respectively with the ends 38a and 38b to stop the front lid 29 at the closed position. When the front lid 29 is held at the closed position, the front surface 16a of the case 16 is covered entirely with the front wall 30 of the front lid 29, the upper open end of the recess 24 is covered with the upper wall 31 of the front lid 29, and a portion of the magnetic tape 21 extending across the pull-out region is covered with the front lid 29.

Support arms 40 (FIGS. 7A-7C, and 10-12) for supporting a back lid 42 project from the inner surface of the upper wall 31 of the front lid 29. The support arms 40 extend to positions slightly above the middle of the height of the front lid 29, and are contiguous respectively with the inner surfaces 41a of walls 41 formed respectively beside the gates 22 and 22' and defining the opposite ends of the recess 24. Circular holes 40a are formed respectively in the lower ends of the support arms 40. Projections 40b project toward the front wall 30 of the front lid 29 respectively from the upper ends of the front edges of the support arms 40.

The back lid 42 for covering the backside and lower side of a portion of the magnetic tape 21 extending across the pull-out region is formed of a synthetic resin. The back lid 42 has a main body 43 having the shape of a strip of a length substantially the same as the interval between the support arms 40 of the front lid 29 and a width a little smaller than that of the front wall 30 of the front lid 29. A longitudinal rib 43b having a semicircular cross section is formed a little above the longitudinal center line of the main body 43 in the backside 43a of the main body 43, and the upper portion of the main body 43 beyond the longitudinal rib 43b is inclined backward relative to the lower portion of the main body 43. Recesses 43c are formed respectively in the opposite ends of the main body 43 at positions corresponding to the opposite extremities of the longitudinal rib 43b. Two coaxial pivots 44 project outward respectively from the bottom surfaces of the recesses 43c. A longitudinal covering rib 45 is formed along the front surface of the main body 43 near the lower edge of the same. Comparatively short arms 46 project backward respectively from the opposite ends of the lower edge of the main body 43. Pins 47 having the shape of circular cylinders project outward respectively from the extremities of the arms 46. Two projections 48 project downward respectively from the opposite ends of the lower edge of the main body 43. The distance between the lower end of each projection 48 and the upper edge of the main body 43 is slightly smaller than the distance between the lower edge of the front wall 30 of the front lid 29 and the lower surface of the upper wall 31 of the same. The pivots 44 are fitted respectively in the holes 40a of the support arms 40 of the front lid 29 so that the back lid 42 is able to swing on the front lid 29 behind the front wall. 30 of the front lid 29, and the pins 47 are inserted respectively in guide grooves 50 formed in walls 41 of the case 16 so as to slide along the latter. Thus, the back lid 42 moves between a closed position (FIG. 7A) and an open position (FIG. 7C) as the front lid 29 swings. The back lid 42 is biased for turning toward the front lid 29 by torsion springs 49 each having a coil section 49a wound round a portion of the pivot 44 between the main body 43 and the support arm 40, an arm 49b in elastic engagement with the back surface of the projection 40b of the support arm 40, and another arm 49c in elastic engagement with a portion of the front surface of the main body 43 merging into the upper surface of the recess 43c. Thus, the back lid 42 is biased clockwise, as viewed in FIG. 12 by the torsion springs 49.

Figure 10:
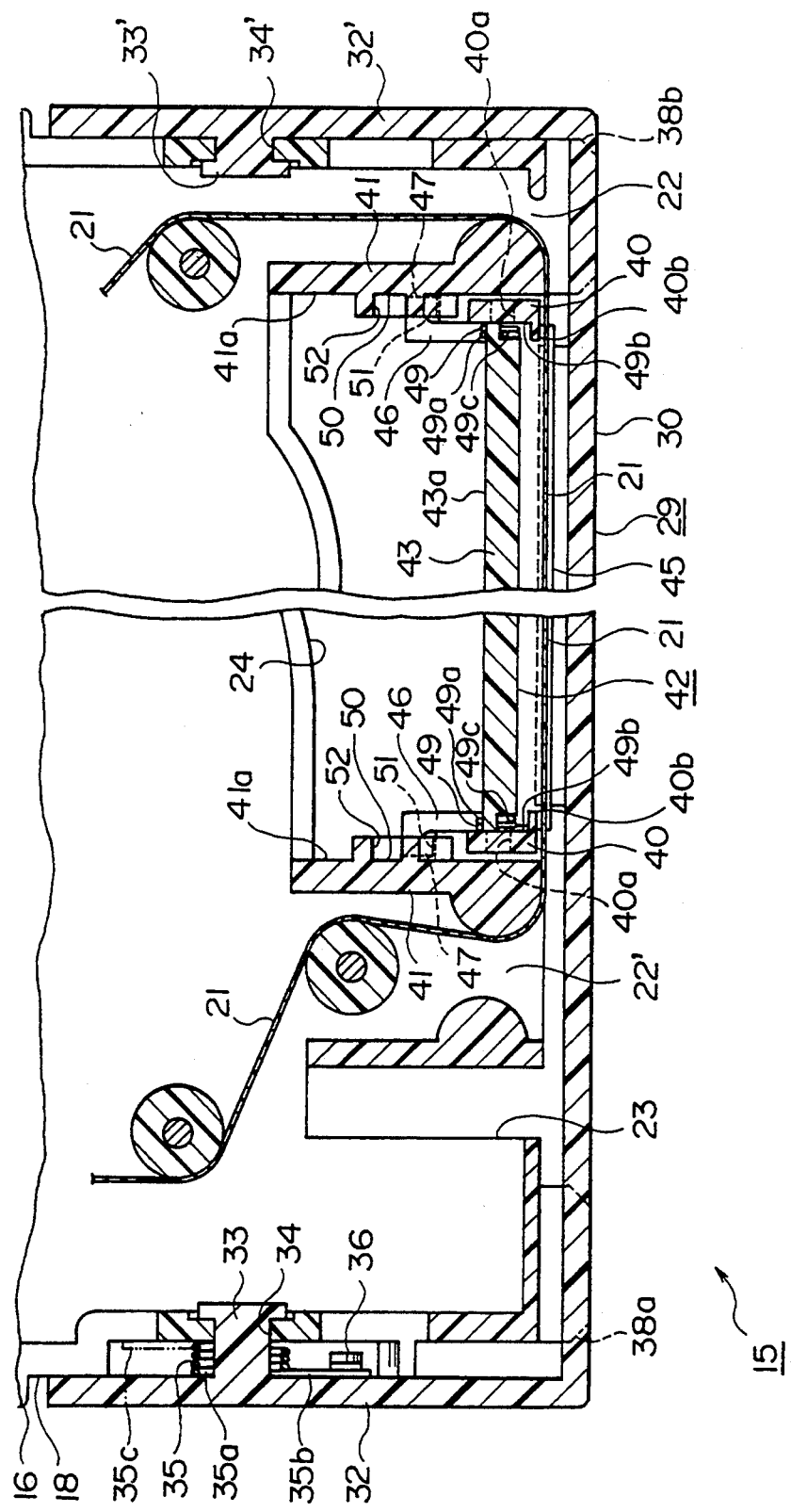
FIG. 10 is an enlarged fragmentary sectional view taken on line X—X in FIG. 7A.
Figure 11:
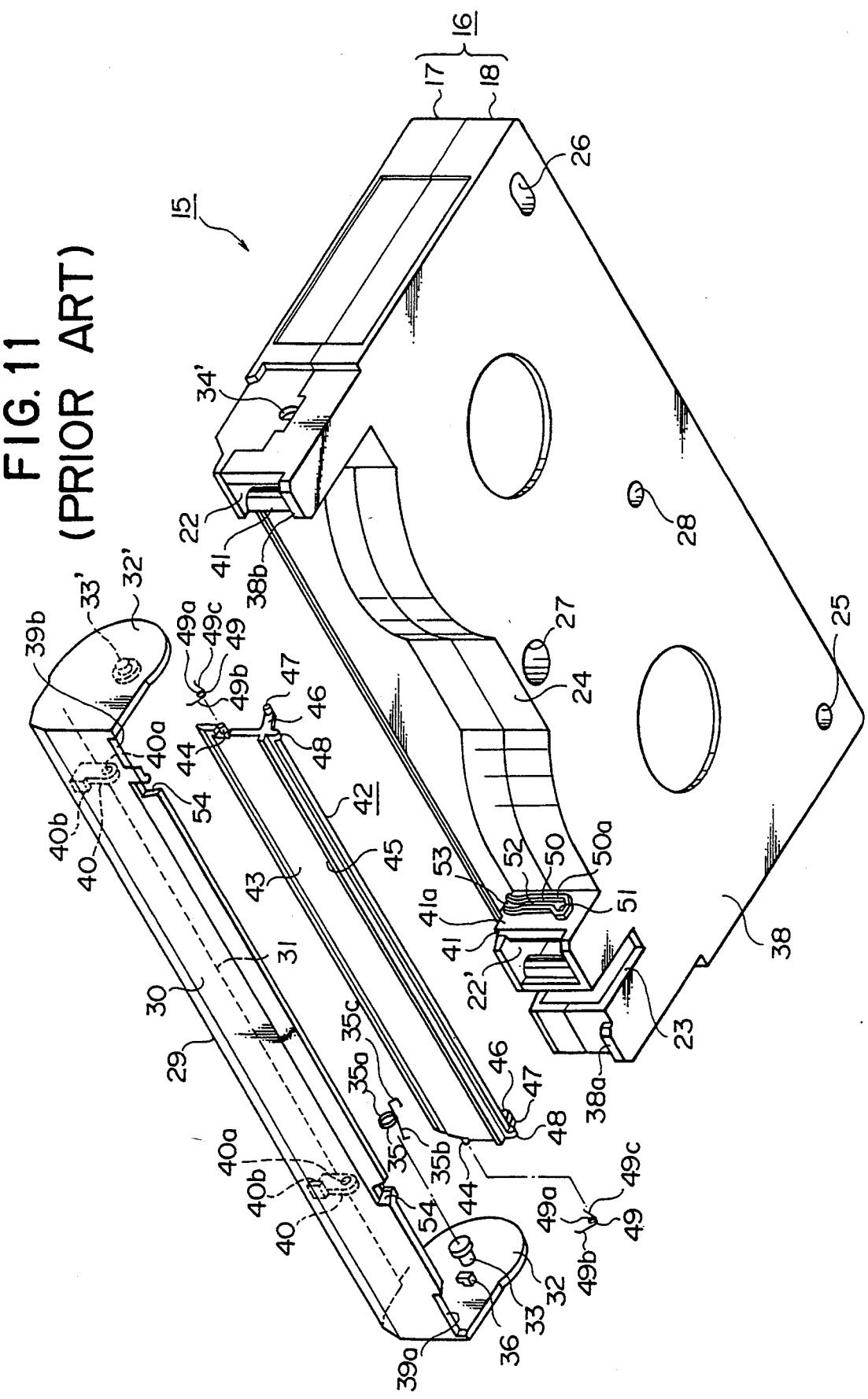
FIG. 11 is an exploded perspective view of the advanced tape cassette of FIGS. 7A to 7C.
Figure 12:
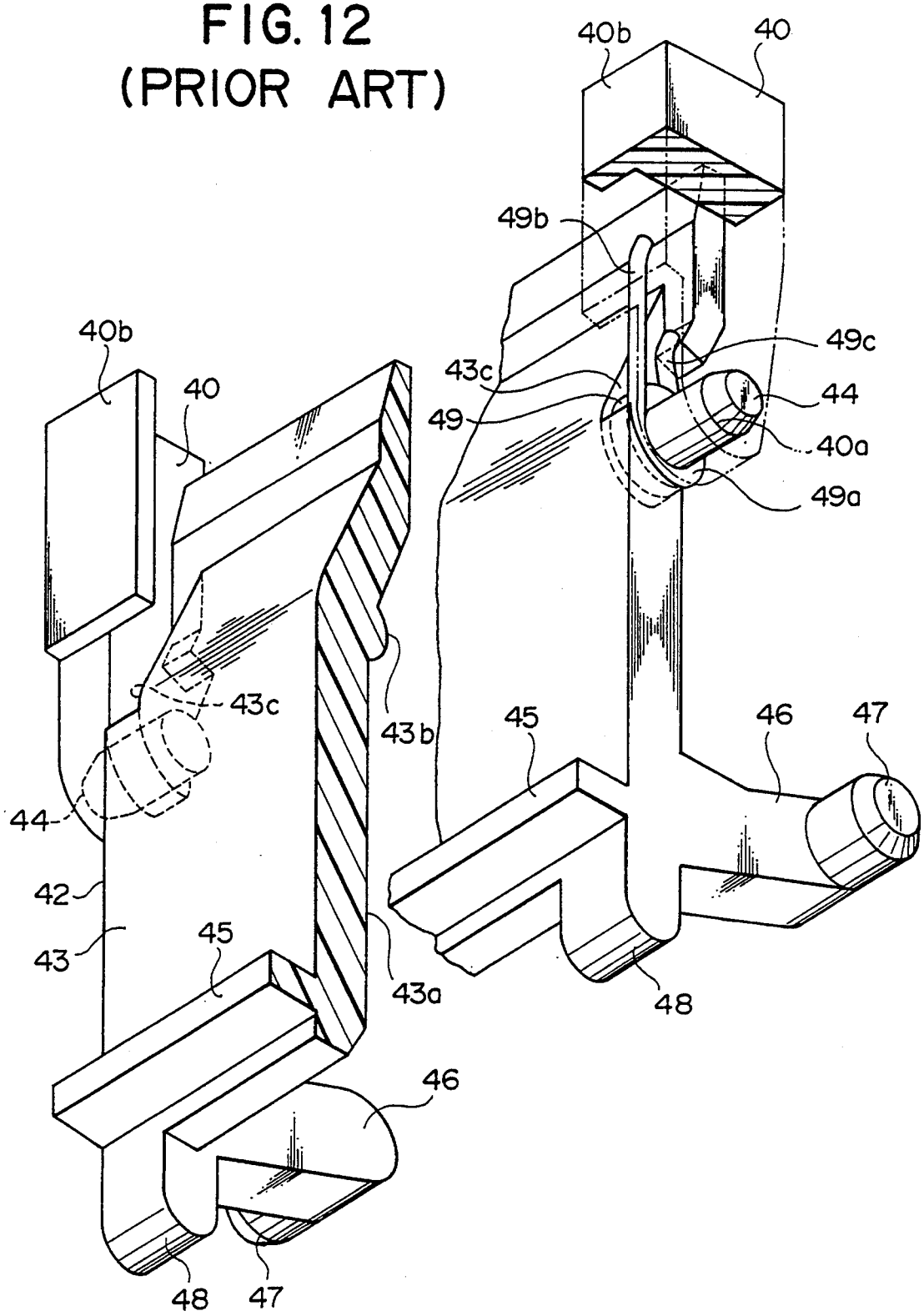
FIG. 12 is an enlarged, partially cutaway, perspective view of the front and back lids.

As shown in FIGS. 10 and 11, ridges 50a are formed on the inner surfaces 41a of the walls 41 of the case 16 to define the guide grooves 50 for guiding the pins 47 of the back lid 42 to control the position of the back lid 42 relative to the front lid 29. The guide grooves 50 are formed so as to lock the back lid 42 at the closed position. Each guide groove 50 has a lower section 51, a middle section 52 and an upper section 53. The lower section 51 is at substantially the same level as the lower edge of a portion of the magnetic tape 21 extending in front of the front surface 16a across the pull-out region. Each of the lower sections 51 has a shape conforming to the circular path of movement of the pin 47 about the axis of the pivot 44 held on the front lid positioned at the closed position. Therefore, when the front lid 29 is turned to the closed position, each pin 47 of the back lid 42 is pressed elastically against the substantially horizontal bottom surface 51a and substantially vertical front surface of the lower section 51 as shown in FIG. 7A to limit the movement of the back lid 42 beyond the closed position toward the front lid 29. When the back lid 42 is at the closed position, the main body 43 of the back lid 42 extends substantially parallel to the front wall 30 of the front lid 29 with the magnetic tape 21 therebetween, with the front end of the covering rib 45 a little below the lower edge of the magnetic tape 21 and lightly in contact with or very close to the inner surface of the front wall 30 of the front lid 29.

When the tape cassette 15 is thus closed, a portion of the magnetic tape extending outside the case 16 is covered with the front lid 29 on the front and upper sides and with the back lid 42 on the back and lower sides. In this state, the back lid 42 is locked at the closed position and is restrained from any opening motion, and thereby the front lid 29 is locked at the closed position. The front lid 29 and the back lid 42 are locked at the respective closed positions by the cooperative action of the lower section 51 of the guide groove 50 and resilience of the torsion springs 49. In FIG. 7A, $L_1$ indicates an extension of the upper surfaces 51c serving as locking surfaces of the lower section 51, R indicates a circular path along which a point on the pin 47 in contact with the upper surface 51c moves if the back lid 42 should be turned with the front lid 29 held at the closed position, l indicates a straight line passing the respective centers of the pin 47 and the corresponding pivot 44 when the tape cassette 15 is closed, and $L_2$ indicates a tangent to the curve R at the intersection point of the straight line l and the circular path R. Each upper surface 51c is tilted backward at a small angle, for example, 5°, to the tangent $L_2$.

A force tending to turn the front lid 29 held at the closed position toward the open position, is transmitted through the front lid 29 to the back lid 42. Since the back lid 42 is biased clockwise, as viewed in FIG. 7A, by the torsion springs 49, the pins 47 under the influence of a force pushing the pins 47 toward the pivots 44 are pressed necessarily against the upper surfaces 51c in a direction along the straight line l. Since the upper surfaces 51c are tilted backward relative to the tangent $L_2$, the pins 47 pressed against the upper surfaces 51c tend to move toward the front and, consequently, the pins 47 are unable to move in either direction to restrain the back lid 42 from turning toward the open position, and hence the front lid 29 is restrained from turning toward the open position accordingly. Thus, both the front lid 29 and the back lid 42 are locked at their closed positions.

The front lid 29 and the back lid 42 are turned toward the open position by a lid opening mechanism included in the recording/reproducing apparatus when the tape cassette 15 is inserted in the recording/reproducing apparatus. Recesses 54 are formed in the lower edge of the front wall 30 of the front lid 29 at positions corresponding to the projections 48 of the back lid 42 as positioned at the closed position. When the tape cassette 15 is inserted in the cassette chamber of the recording-/reproducing apparatus, unlocking members (not shown) included in the lid opening mechanism extend through the recesses 54 to push the projections 48 backward and, consequently, the back lid 42 is turned counterclockwise, as viewed in FIG. 7B, on the pivots 44 as far as each pin 47 are pushed to a position at the junction of the lower section 51 and the middle section 52. Subsequently, a lid opening member having a portion that moves upward through the groove 23 urges the front lid 29 for turning toward the open position. As the front lid 29 is thus turned toward the open position, turning the pivots 44 supported on the front lid 29 on the pivots 33 and 33', each pin 47 moves along the guide groove 50 from the lower section 51 through the middle section 52 and the upper section 53 to the open position as shown in FIG. 7C. The inclination of the back lid 42 with respect to the front wall 30 of the front lid 29 increases gradually while each pin 47 is moving in the middle section 52 toward the upper section 53, the inclination decreases gradually while each pin 47 is moving in the upper section 53, and the back lid 42 extends substantially parallel to the front wall 30 of the front lid 29 at its open position. The series of opening actions of the front lid 29 and the back lid 42 is reversed in moving the front lid 29 and the back lid 42 to their closed positions.

(3) Comparison of the VHS Tape Cassette and the Advanced Tape Cassette

Referring again to FIG. 13 it will be seen that when the conventional VHS tape cassette 1 and the advanced tape cassette 15 are diagrammatically superposed, the recesses 6, 7 and 8 of the VHS tape cassette 1 lie within the recess 24 of the advanced tape cassette, the magnetic tape 21 of the advanced tape cassette 15 is a little to the front of the magnetic tape 4 of the VHS tape cassette 1, and the grooves 13 and 23, the holes 11 and 27 for receiving the light emitting head, and the holes 12 and 28 for receiving the reel unlocking pins coincide with each other, respectively. The locating hole 10 of the VHS tape cassette 1 is within an area corresponding to the recess 24 of the advanced tape cassette 15, and the locating hole 9 of the VHS tape cassette 1 is at a position corresponding to an imperforate portion the bottom wall of the advanced tape cassette 15. On the other hand, both the locating holes 25 and 26 of the advanced tape cassette 15 are at locations corresponding to imperforate portions of the bottom wall of the VHS tape cassette.

RECORDING/REPRODUCING APPARATUS (FIG. 4)

Figure 4:
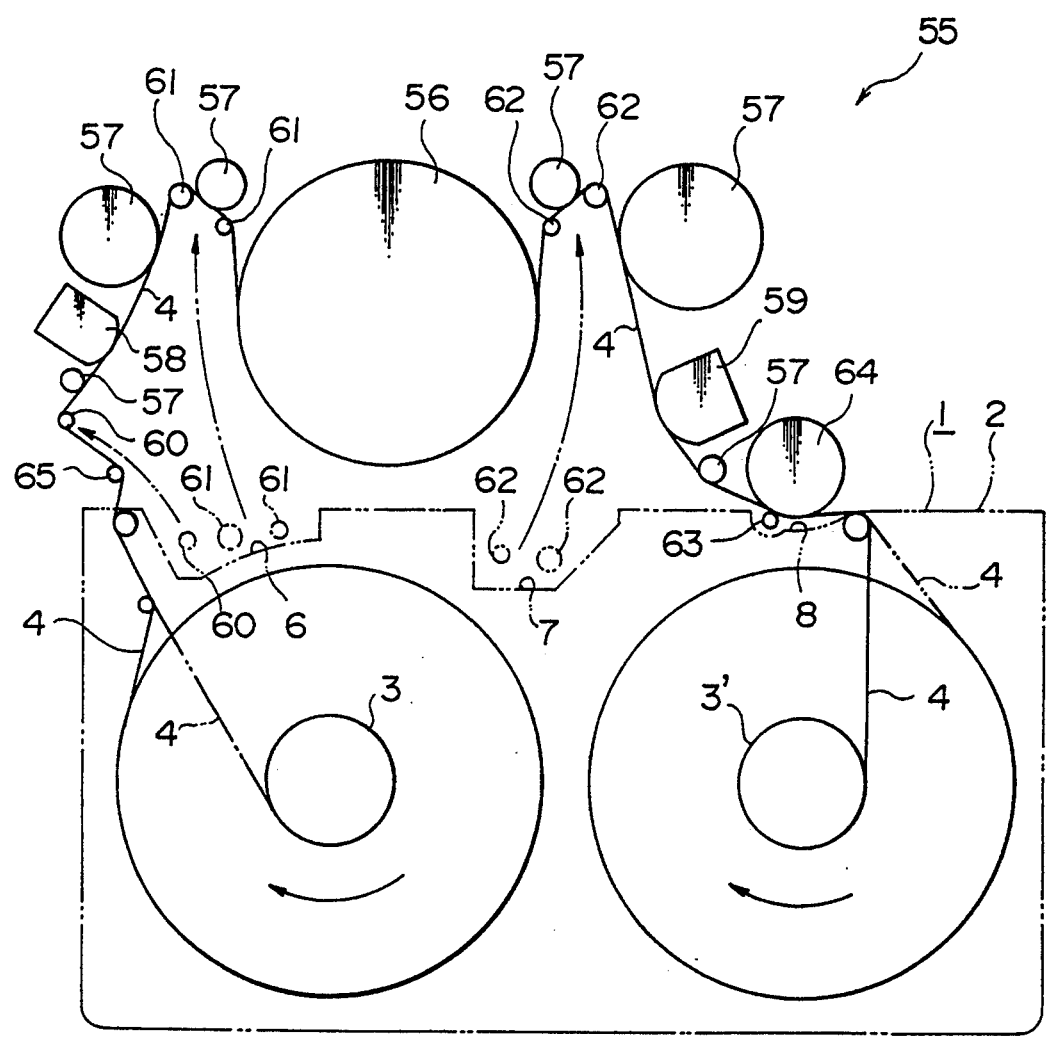
FIG. 4 is a schematic plan view of the recording/reproducing apparatus of FIG. 1.

In FIG. 4, the VHS tape cassette 1 is shown inserted in a recording/reproducing apparatus 55. The tape reels 3 and 3' of the tape cassette 1 engage the reel shafts of reel tables, not shown, respectively. Shown also in FIG. 4 are a head drum 56 provided with a rotary magnetic head, not shown, guide rollers 57, an erasing head 58, and an audio erasing head unit 59 provided with an audio erasing head, an audio head and a control signal head.

When the tape cassette 1 is inserted in the recording-/reproducing apparatus 55, a swing guide 60 and loading tape guides 61 lie within the recess 6, loading tape guides 62 lie within the recess 7, and a capstan 63 lies within the recess 8. Upon the start of a recording or reproducing operation, the swing guide 60 and the loading tape guides 61 and 62 are shifted respectively to their predetermined operating positions to pull out the magnetic tape 4 from the case 2 so that the magnetic tape 4 is extended along a predetermined tape path, a pinch roller 64 presses the magnetic tape 4 against the capstan 63, and a tension regulator 65 is brought into elastic contact with the magnetic tape 4.

When the advanced tape cassette 15 is inserted in the recording/reproducing apparatus 55, the swing guide 60, the loading tape guides 61 and 62, and the capstan 63 lie within the recess 24, because the recess 24 covers an area including the recesses 6, 7 and 8 of the VHS tape cassette 1. The swing guide 60 and the loading tape guides 61 and 62 are shifted respectively to their predetermined operating positions to pull out the magnetic tape 21 from the case 16 so that the magnetic tape 21 is extended along the predetermined tape path.

As shown in FIG. 13, the respective grooves 13 and 23, holes 11 and 27 for receiving the light emitting head, and holes 12 and 28 for receiving the reel unlocking pin of the two tape cassettes 1 and 15 coincide with each other, respectively, so that the lid opening plate, the light emitting head of the tape end sensor, and the reel unlocking pin are able to function in the same manner for both the tape cassettes 1 and 15.

LOCATING PINS DEVICES (FIGS. 1 TO 3)

A locating pin device 66 to be received in the locating hole 10 of the VHS tape cassette 1 may be fixed. Locating pin devices 67, 68 and 69 respectively for the locating holes 9, 25 and 26 must be provided with retractable locating pins which retract when depressed. Since the locating pin devices 67, 68 and 69 are of the same construction, only the locating pin device 67 will be described in detail with reference to FIGS. 2 and 3. As there shown, a support cylinder 70 is set upright on a cassette mount 71 provided on a chassis. The support cylinder 70 is provided at its upper end with an inner flange 73 defining an opening 74. The locating pin device 67 has a retractable locating pin 75 which moves axially in the support cylinder 70. The retractable locating pin 75 has a base portion 76 having the shape of a circular cylinder, and a pin portion 77 integral with the base portion 76. The base portion 76 is provided with a bore 76a opening downward and has an outside diameter slightly smaller than the inside diameter of the support cylinder 70. The base portion 76 slides axially in the support cylinder 70. The pin portion 77 has a root 77a having the shape of a short circular cylinder, and a guide head 77b integral with the root 77a and having the shape of the frustum of a right circular cone. The root 77a of the pin portion 77 has an outside diameter slightly smaller than the opening 74 of the support cylinder 70. The pin portion 77 can depressed through the opening 74 into the support cylinder 70. A compression coil spring 78 in the support cylinder 70 has an upper end inserted in the bore 76a of the base portion 76 of the retractable locating pin 75, and a lower end seated on the upper surface of the cassette mount 71. When net depressed, the retractable locating pin 75 is held resiliently at its operating position by the compression coil spring 78 with the pin portion 77 projected through the opening 74 from the support cylinder 70 and with the upper shoulder 76b of the base portion 76 in contact with the inner flange 73 of the support cylinder 70.

Figure 1:
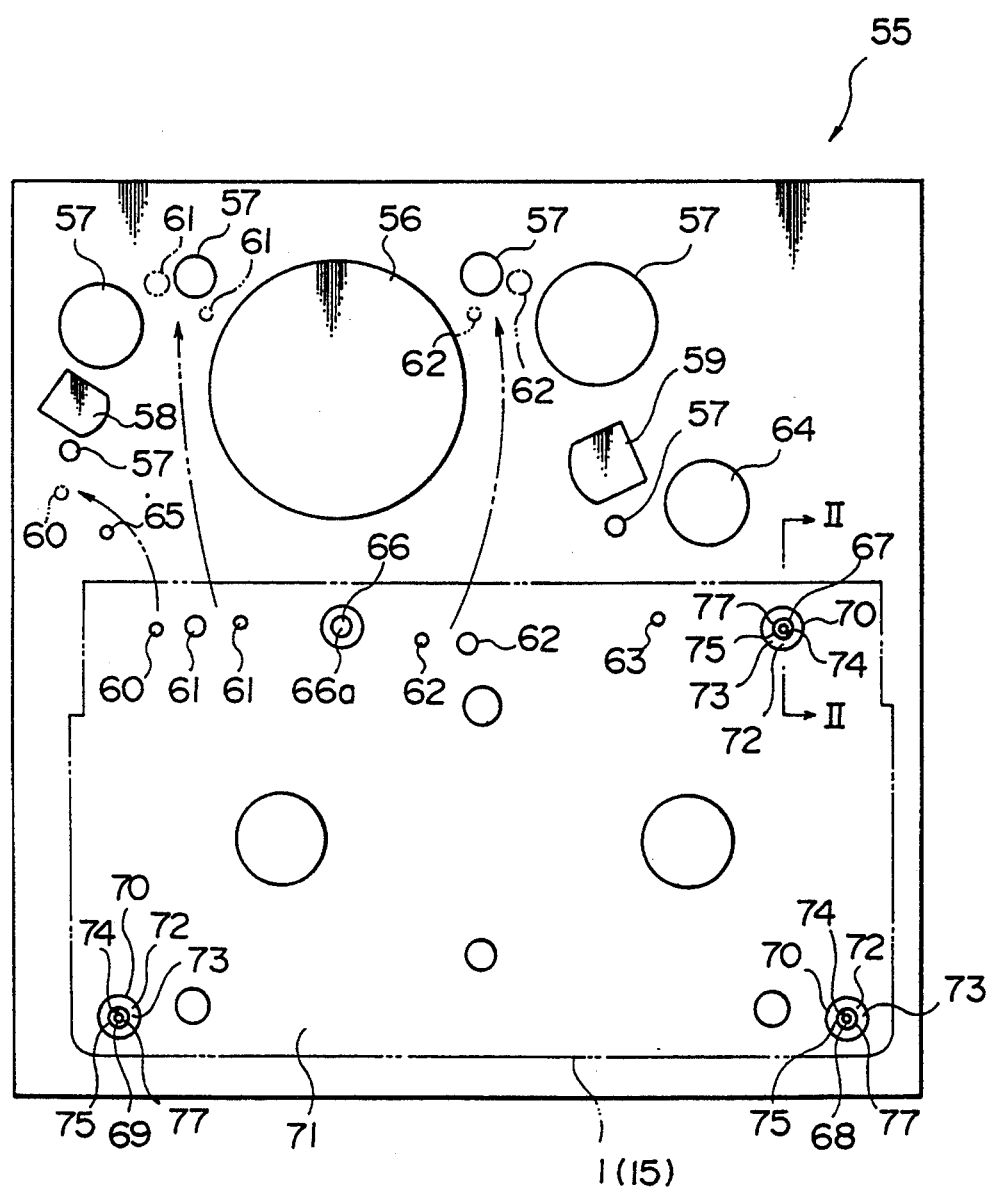
FIG. 1 is a plan view of the cassette operating unit of a recording/reproducing apparatus according to a preferred embodiment of the present invention.
Figure 2:
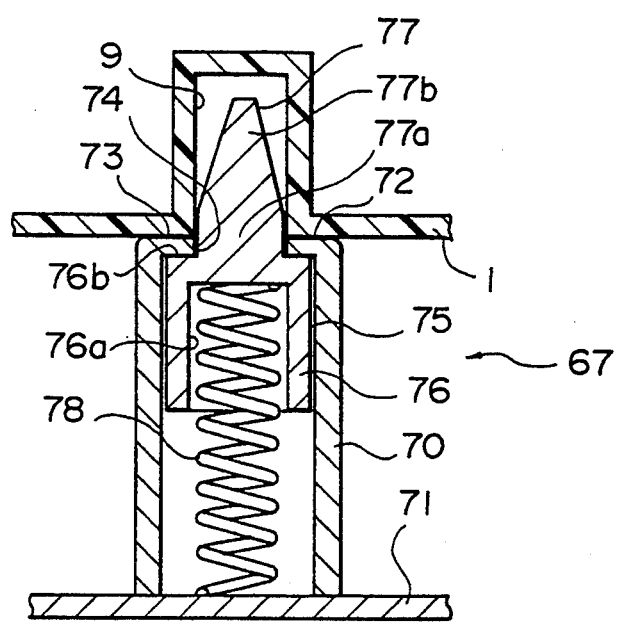
FIG. 2 is an enlarged sectional view taken on line II—II in FIG. 1, showing a retractable locating pin at its locating position.
Figure 3:
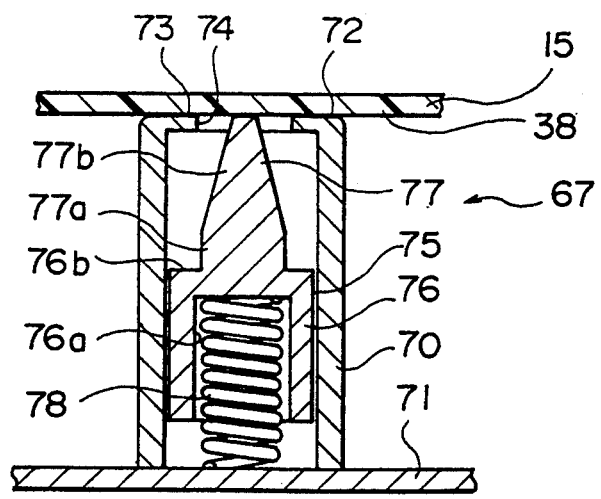
FIG. 3 is an enlarged sectional view similar to FIG. 2, showing the retractable locating pin of FIG. 2 at its retracted position.

When the VHS tape cassette 1 is mounted on the cassette mount 71, the locating hole 9 coincides with the locating pin device 67, so that the pin portion 77 is fitted in the locating hole 9 to locate the tape cassette 1, as on FIG. 2. When the advanced tape cassette 15 is mounted on the cassette mount 71 and such tape cassette lacks a locating hole at the location of the respective locating pin device, the bottom wall of the case 16 of the advanced tape cassette 15 depresses the retractable locating pin 75 to push the retractable locating pin 75 into the support cylinder 70 against the resilience of the compression coil spring 78 so that the bottom wall of the case 16 is seated on the upper end surface 72 of the support cylinder 70.

When the VHS tape cassette 1 is mounted on the cassette mount 71, the pin portion 77 of the retractable locating pin 75 of the locating pin device 67 is fitted in the locating hole 9, the pin portion 66a of the fixed locating pin device 66 is fitted in the locating hole 10, and the pin portions 77 of the retractable locating pins 75 of the retractable locating pin devices 68 and 69 are pushed into the corresponding support cylinders 70 so that the bottom wall of the tape cassette 1 is seated on the upper end surface 72 of the support cylinders 70. Thus, the tape cassette 1 is located correctly on the cassette mount 71.

When the advanced tape cassette 15 is mounted on the cassette mount 71, the pin portions 77 of the retractable locating pins 75 of the locating pin devices 68 and 69 are fitted respectively in the locating holes 25 and 26, the pin portion of the fixed locating pin of the locating pin device 66 lies in the recess 24, and the retractable locating pin 75 of the locating pin device 67 is pushed into the support cylinder 70 to seat the bottom wall of the case 16 on the upper end surfaces 72 of the support cylinders 70. Thus, the tape cassette 15 is located correctly on the cassette mount 71. The cassette mount 71 may be provided with a height adjusting pin that is to be in contact with the bottom wall of the case 16 when the tape cassette 15 is located correctly on the cassette mount 71 to hold the tape cassette 15 in a stable state at the correct position.

The recording/reproducing apparatus is provided with a cassette holder for holding the tape cassette on the cassette mount 71 and other parts essential to recording or reproducing operation, the description thereof will be omitted because the present invention is not directly related to those component parts of the recording/reproducing apparatus.

As is apparent from the foregoing description, the recording/reproducing apparatus in accordance with the present invention is capable of operating with either one of two different types of tape cassettes, due to the retractability of locating pin devices that do not correspond to locating holes in a tape cassette's locating hole pattern, leaving the locating pin devices that do correspond with locating holes in the pattern to engage in such locating holes and to thereby locate the tape cassette correctly on the recording/reproducing apparatus.

The invention may be embodied in other specific forms without departing from the scope or essential characteristics thereof. The present embodiment is therefore to be considered in all respects as illustrative and not restrictive. It is therefore to be understood that the invention may be practiced otherwise than as specifically described herein without departing from the scope and spirit thereof.

What is claimed is:

1. A recording/reproducing apparatus adapted for operating with either one of two different types of tape cassettes, said two types of tape cassettes being of substantially the same length and differing slightly in width, each of said types of tape cassettes including a cassette housing with a bottom wall having an underside formed with locating holes in a respective pattern which pattern is different from that of the locating holes of the other of said types of tape cassettes, comprising:

cassette mounting means adapted to have either one of said two types of tape cassettes positioned thereon; and a plurality of locating pin devices on said cassette mounting means at locations corresponding to the patterns of said locating holes of said two types of tape cassettes, at least three of said locating pin devices including respective retractable locating pins adapted for being pushed downward so as to be retracted by the underside of the bottom wall of the positioned tape cassette when the latter lacks a locating hole at the location of the respective locating pin device and for respectively engaging a locating hole when such locating hole is at the location of the respective locating pin device, all of the locating pins being either retracted or engaged in a respective locating hole when either one of said two types of tape cassettes are positioned on said cassette mounting means.

2. A recording/reproducing apparatus according to claim 1, wherein each of said locating pin devices which includes a retractable locating pin has a support cylinder for accommodating the retractable locating pin when the latter is pushed downward by the underside of the bottom wall of the positioned tape cassette.

3. A recording/reproducing apparatus according to claim 2, wherein each of said locating pin devices which includes a retractable locating pin has biasing means by which the retractable locating pin is biased upward.

4. A recording/reproducing apparatus according to claim 3, wherein said support cylinder has stopping means for limiting the upward movement of said retractable locating pin by said biasing means.

5. A recording/reproducing apparatus according to claim 4, wherein each said retractable locating pin has a tapered head.

6. A recording/reproducing apparatus according to claim 6, wherein a first of said two types of tape cassettes has a structure for defining a tape gate at a location that corresponds to a location of one of said at least three retractable locating pins, and said structure for defining a tape gate includes a portion of said bottom wall of said first of said two types, said one of said retractable locating pins being pushed downward by the underside of said portion of said bottom wall when said first of said two types is positioned on said cassette mounting means, and said one of said retractable locating pins being accommodated in a locating hole of a second of said two types of tape cassettes when said second of said two types is positioned on said cassette mounting means.

7. A recording/reproducing apparatus according to claim 1, wherein:

two of said at least three retractable locating pins are accommodated in respective locating holes of a first of said two types of tape cassettes, and a third of said at least three retractable locating pins is pushed downward by the underside of the bottom wall of said first of said two types, when said first of said two types is positioned on said cassette mounting means; and said two retractable locating pins are pushed downward by the underside of the bottom wall of a second of said two types of tape cassettes, and said third retractable locating pin is accommodated in a locating hole of said second of said two types, when said second of said two types is positioned on said cassette mounting means.

8. A method of positioning a tape cassette on a cassette mounting section of a recording/reproducing apparatus, said tape cassette having a bottom side with at least one locating hole formed therein, the method comprising the steps of:

providing a plurality of retractable locating pins on said cassette mounting section of said recording/reproducing apparatus;

positioning said tape cassette on said cassette mounting section of said recording/reproducing apparatus so that a first one of said plurality of retractable locating pins is inserted in an unretracted condition into said locating hole formed in said bottom side of said tape cassette; and retracting a second one of said plurality of retractable locating pins at a time when said first one of said retractable locating pins is inserted into said locating hole.

9. A method of positioning a tape cassette according to claim 8; in which said step of retracting said second one of said plurality of retractable locating pins includes pushing downward said second one of said plurality of retractable locating pins by means of said bottom side of said tape cassette.

10. A method of operating a recording/reproducing apparatus adapted for use with either one of two different types of tape cassettes, said two types of tape cassettes being of substantially the same length and differing slightly in width, each of said types of tape cassettes including a cassette housing with a bottom wall having an underside formed with locating holes in a respective pattern which pattern is different from that of the locating holes of the other of said types of tape cassettes, said apparatus including cassette mounting means adapted to have either one of said two types of tape cassettes positioned thereon, said cassette mounting means having a plurality of locating pin devices including respective retractable locating pins, said retractable locating pins at locations on said cassette mounting means corresponding to the patterns of said locating holes of said two types of tape cassettes, the method comprising the steps of:

positioning a first of said two types of tape cassettes on said cassette mounting means;

retracting a first one of said plurality of locating pins and maintaining a second one of said plurality of locating pins in an unretracted condition, when said first of said two types of tape cassettes is positioned on said cassette mounting means;

positioning a second of said two types of tape cassettes on said cassette mounting means at a time when said first of said two types of tape cassettes is not positioned on said cassette mounting means; and retracting said second one of said plurality of locating pins and maintaining said first one of said plurality of locating pins in an unretracted condition, when said second of said two types of tape cassettes is positioned on said cassette mounting means.

11. A method of operating a recording/reproducing apparatus according to claim 10; wherein said plurality of retractable locating pins includes a third retractable locating pin, and further comprising the steps of:

maintaining said third retractable locating pin in an unretracted condition when said first of said two types of tape cassettes is positioned on said cassette mounting means: and retracting said third retractable locating pin when said second of said two types of tape cassettes is positioned on said cassette mounting means.

12. A method of operating a recording/reproducing apparatus according to claim 11; wherein:

said step of retracting said first one of said plurality of locating pins includes pushing downward said first one of said plurality of locating pins by means of the underside of said first of said two types of tape cassettes; and said steps of retracting said second one of said plurality of locating pins and retracting said third retractable locating pin are performed substantially simultaneously by pushing downward said second one of said plurality of locating pins and said third retractable locating pin by means of the underside of said second of said two types of tape cassettes.

13. A method of operating a recording/reproducing apparatus according to claim 11; wherein said locating pin devices corresponding to said second and third retractable locating pins each include a respective support pin device mounted on the cassette mounting means for accommodating the respective retractable locating pin in its retracted condition; and each of said two types of tape cassettes has a front end from which tape is withdrawn and a back end that is opposed to said front end in the widthwise direction of the cassette; and further comprising the steps of:

supporting said first of said two types of tape cassettes on said support pin devices at respective portions of the bottom wall of said cassette adjacent said back end thereof when said cassette is positioned on said cassette mounting means; and supporting said second of said two types of tape cassettes on said support pin devices at respective portions of the bottom wall of said cassette adjacent said back end thereof when said cassette is positioned on said cassette mounting means.

* * * * *